July 31, 1934. J. J. MIZER 1,968,416
CAR SUPPORT FOR AUTOMOBILE HOISTS
Filed Feb. 23, 1934 3 Sheets-Sheet 1

Inventor
Joseph J. Mizer
By Barnett & Truman
Attorneys.

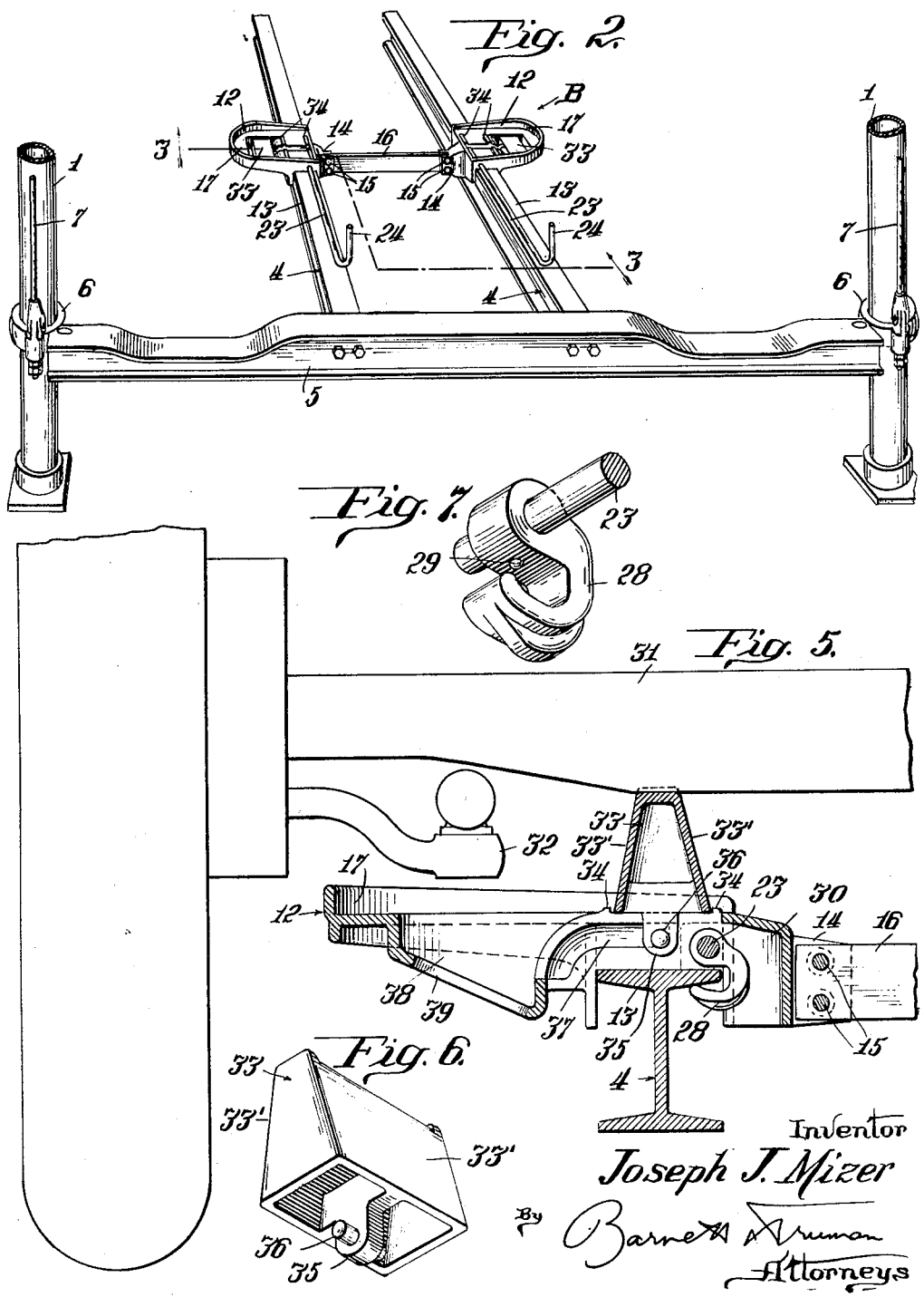

July 31, 1934.  J. J. MIZER  1,968,416
CAR SUPPORT FOR AUTOMOBILE HOISTS
Filed Feb. 23, 1934  3 Sheets-Sheet 3
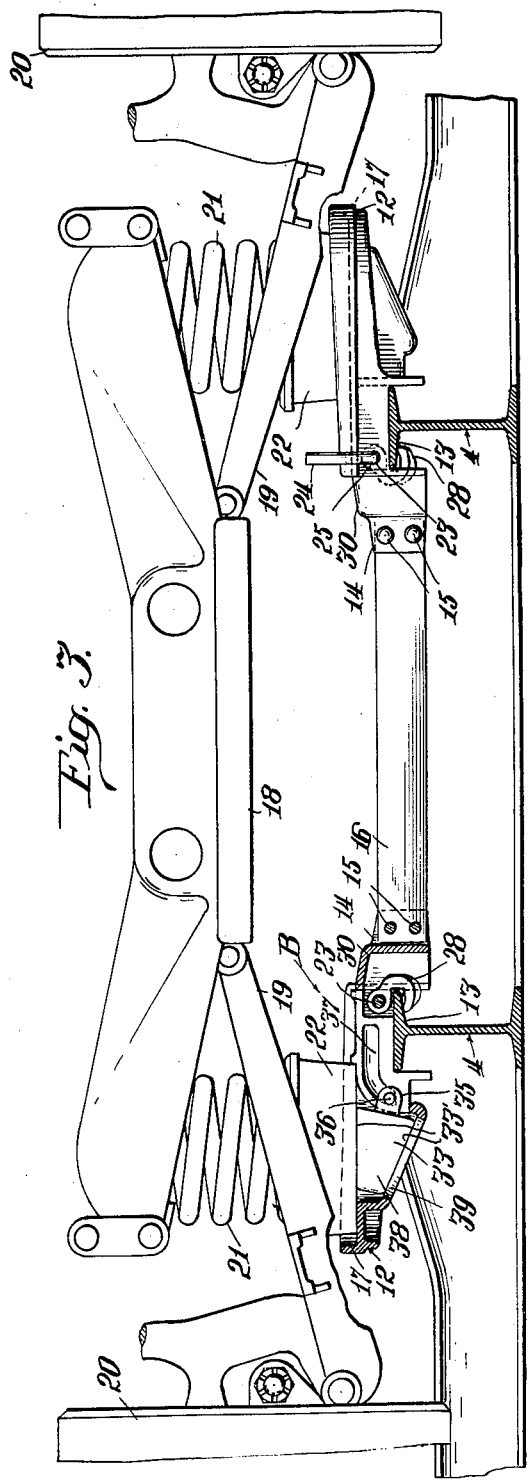
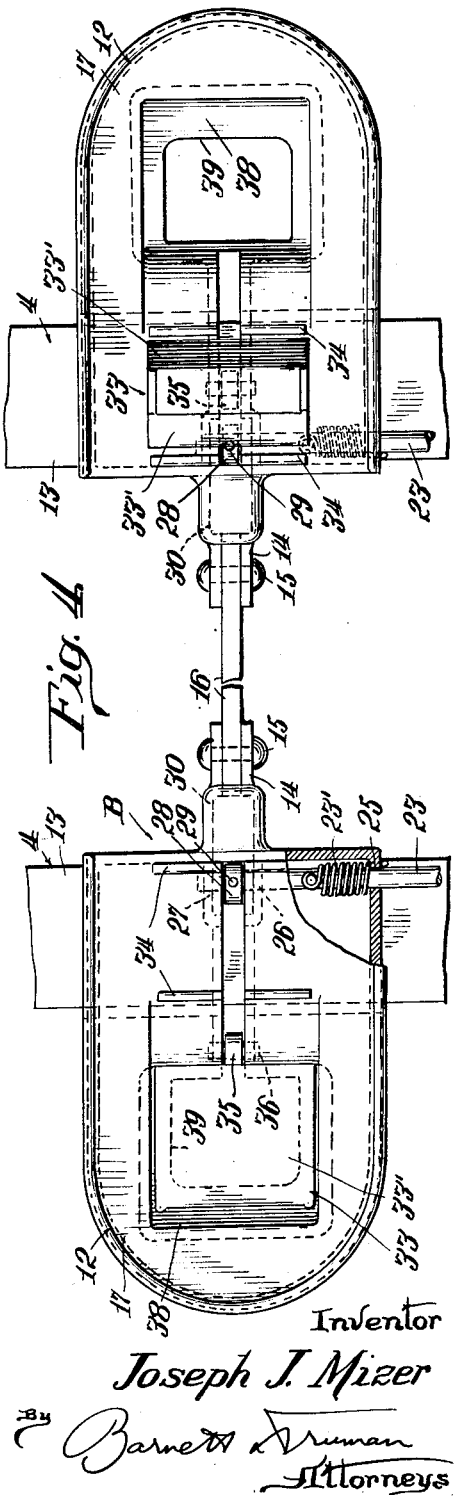
Inventor
Joseph J. Mizer Patented July 31, 1934

1,968,416

UNITED STATES PATENT OFFICE 1,968,416

CAR SUPPORT FOR AUTOMOBILE HOISTS

Joseph J. Mizer, Racine, Wis., assignor to Walker Manufacturing Company, Racine, Wis., a corporation of Wisconsin Application February 23, 1934, Serial No. 712,543

12 Claims. (Cl. 254—89)

This invention relates to a certain new and improved form of car support for automobile hoists, and more particularly to an improved device incorporated in the hoisting mechanism for engaging beneath and supporting the front end portion of the automobile chassis.

Certain forms of hoisting devices designed for raising an automobile bodily and supporting it in an elevated position so that access may be conveniently had to the under portions of the car for greasing or repairing the same comprise a carriage structure adapted to engage beneath and support the car between the wheels, this carriage usually embodying a pair of similar spaced apart parallel beams, suitably tied together at intervals and extending longitudinally beneath the car. A cradle or rest which bridges the two beams and is usually adjustable longitudinally thereof is adapted to engage beneath and support a portion of the rear-axle structure and thus carry the rear end portion of the automobile. The front end portion of the car may be supported by the front axle resting directly upon the beams, or suitable blocks or supports may be interposed between the beams and the front axle which extends transversely thereabove.

In some new car designs the front wheel supports, and front springs have been changed so as to permit individual vertical movements of the two front wheels, and in order to accomplish this the front axle has either been eliminated or radically changed in construction so that in some types of cars there are no portions positioned in vertical alignment with the beams of the hoist-carriage that are adapted to be engaged for supporting the car. The adjustable supporting means or rest which forms the particular subject matter of this invention has been designed for the purpose of permitting these different types of automobiles to be supported by the single standard type of hoist-carriage. This rest or supporting member comprises a pair of similar platforms, one slidably positioned on each beam, the platforms being rigidly tied together by a bar or truss member secured to the two platforms and extending transversely between the beams. Each platform projects outwardly beyond the outer side of its supporting beam so as to project under and form a support for a suitable portion of the front-spring assembly. Certain other types of cars have a transverse axle which might be supported directly on the beams or on the platforms, but on account of certain downwardly hanging portions of the steering assembly or other mechanism that would engage the platforms before the axle is engaged by the supporting member, it is necessary to provide vertically extending blocks which are interposed between the inner portions of the platforms and the axle for supporting the axle in a raised position above the platforms. These blocks are movably attached to the platforms and are adapted to be swung from the operative position just described down to an inoperative position in which they are housed within suitable sockets formed in the platforms. This combined structure is capable of conveniently supporting substantially any form of front axle or spring assembly now in use.

The principal object of this invention is to provide an improved car support for automobile hoists, such as briefly described hereinabove and disclosed more in detail in the specifications which follow.

Another object is to provide a supporting device of this type which is conveniently adjustable longitudinally of the hoist carriage and easily removable therefrom.

Another object is to provide improved means for holding the supporting device down on the carriage beams, while permitting the support to be easily removed from the beams.

Another object is to provide a car support which is readily adjustable to engage different types of front axle or spring assemblies.

Other objects and advantages of this invention will be more apparent from the following detail description of one approved form of mechanism constructed and operating according to the principles of this invention.

In the accompanying drawings:

Fig. 2 is a perspective view of part of the front end portion of this hoist.

Fig. 3 is a transverse vertical section taken substantially on the line 3—3 of Fig. 2 but on a larger scale, and indicating one type of automobile front-end supported by the hoist.

Fig. 4 is a plan view of the improved car support on a still larger scale, the adjustable supporting block of the left-hand platform being shown in lowered position as in Fig. 3, whereas the right-hand block is shown in upright position as in Fig. 5.

Fig. 5 is a transverse vertical section, similar to the left-hand portion of Fig. 3, but showing the supporting block in upright position to support a different type of front-axle assembly.

Fig. 6 is a perspective view of one of the axle-supporting blocks.

Fig. 7 is a perspective view of one of the hooks for holding the supporting device in position on the beams.

Figure 1:
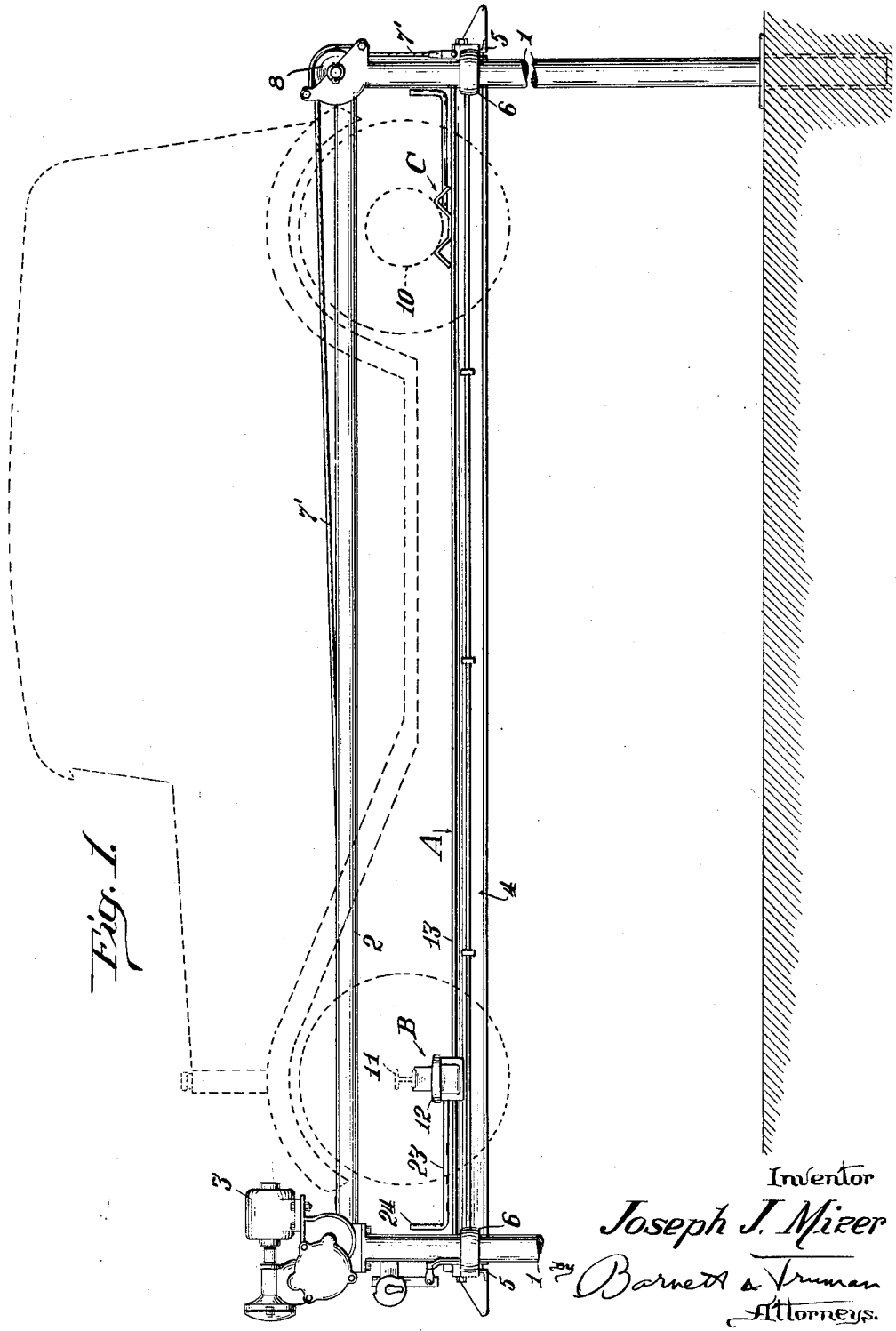
Fig. 1 is a side elevation of one type of automobile hoist equipped with this improved car support, the outlines of an automobile supported by the hoist being indicated in dotted lines.

Referring first to Figs. 1 and 2, the automobile hoist here shown is of the type disclosed more in detail and claimed in the copending application of Walker, Serial No. 651,977 filed January 16, 1933, now Patent No. 1,958,026, granted May 8, 1934. This apparatus comprises four separate upright posts or standards independently supported adjacent the corners of a clear space into or through which the automobile may be run. The two posts 1 at each side of the supporting frame are connected at their upper ends by a longitudinally extending brace or pipe-section 2, and the upper ends of the two posts at the front of the frame are connected by a transverse shaft carrying the hoisting drums which are driven by the motor assembly indicated at 3. The load-supporting carriage indicated generally at A comprises two parallel longitudinally extending I-beams 4 which are connected adjacent their ends by the transverse beams 5 having guide loops 6 at their ends which slidably engage the posts or uprights 1. A pair of cables 7 are anchored at their lower ends to the end portions of the forward cross beam 5 and extend upwardly adjacent the front posts 1 and are anchored at their other ends to the winding mechanism. The cross beam 5 at the other end of the carriage is supported by a similar pair of cables 7' which extend upwardly over direction sheaves 8 and thence extend horizontally adjacent the braces 2 and are secured to the winding mechanism. The carriage A is raised or lowered to raise or lower the automobile by drawing in or paying out the several cables 7 and 7'. The spaced apart beams 4 extend longitudinally beneath the car chassis, between the wheels as indicated in Fig. 1, and supporting mechanisms indicated generally at B and C are mounted on the beams 4 for supporting the front and rear end portions of the car respectively. In order to accommodate cars of different length, one or the other of the devices B and C, preferably both of them, are adjustable longitudinally of the beams 4. The support C may be in the form of a cradle resting slidably at its ends on the respective beams 4 and adapted to engage beneath and support the differential housing 10 or some other suitable portion of the rear axle assembly. The front supporting device B (which forms the particular subject matter of this invention) is adapted to engage beneath the front axle 11, or one of the new spring assemblies which is used in lieu of such an axle. In earlier forms of hoists of this type, the device B has consisted simply of a pair of chocks or supporting blocks slidably positioned on the beams 4 so as to be interposed between the respective beams and the portion of the axle 11 positioned thereover.

It might be here mentioned that although one approved form of hoisting device has been briefly described by way of example, there are other forms of hoists now in use which employ hydraulic rams or other motor means for raising and lowering the car supporting carriage. Many of these hoisting devices, however, have a carriage comprising a pair of spaced apart parallel beams such as the beams 4 herein disclosed, and the specific front-end supporting mechanism now to be described might be used with any of these carriages as well as with the one herein disclosed by way of example.

The improved supporting device B comprises a pair of similar platforms 12 each preferably in the form of a single casting shaped adjacent one end to fit over and rest upon the upper horizontal flange 13 of the I-beam 4. At its inner end the casting 12 is formed with an extension 14 which is bolted or otherwise rigidly secured at 15 to a bar or truss member 16 which extends transversely between the I-beams and serves to tie the platforms rigidly together. The main portion of each platform 12 extends outwardly beyond the outer side of the supporting beam 4 so as to provide an upwardly facing cupped portion 17 for receiving and supporting a portion of the car structure.

The front end portion of the car partially illustrated in Fig. 3 comprises a fixed central plate 18 to the sides of which are hinged frames 19 which project outwardly and downwardly and connect at their outer ends with the brake and wheel assemblies 20. The lower end portions of the coil springs 21 rest in cups or bearings 22 which are carried by the hinged frames 19. These cups 22 are the most practical devices to be engaged for supporting the front-end assembly of the car, but these cups 22 are not in vertical alignment with the beams 4 but are positioned considerably beyond the outer sides of these beams. For this reason the platforms 12 are provided, the cups 24 resting on these platforms as clearly shown in Fig. 3. Obviously the platforms 12 would tip over at the outer sides of the beams if they were not connected together to form a rigid assembly by the transverse bar 16.

For some reason, for example if one front tire is partially deflated, one of the spring cups 22 may be positioned lower than the other so as to be engaged first by one of the platforms 12 as the hoist carriage is raised. Obviously if the supporting device B merely rested on top of the two beams 4 and a load is applied to only one of the platforms 12, the supporting device will be tilted so as to raise the other platform from its supporting beam. For this reason means are provided for anchoring each platform to its supporting beam without interfering with the sliding adjustment of the platforms longitudinally of the beams. A rod 23 provided at its forward end with an upwardly projecting handle portion 24 extends at its rear end rotatably through suitable bearings 25, 26 and 27 formed in the platform casting, and a hook member 28 (see Fig. 7) is secured on the rear end portion of rod 23, for example by the transverse pin 29. This hook 28 normally engages under the adjacent end of top flange 13 of the I-beam, but may be swung up into the housing 30 formed in the platform casting so as to permit the supporting device B to be lifted off from the beam. A torsion spring 23' anchored at one end to the rod 23 and at the other end to a suitable portion of platform 12 tends to keep the hook in the normal position shown in Figs. 3 and 5 so as to lock the supporting device to the I-beam. The rod 23 extends along the upper surface of beam 4 so that the handle 24 can be conveniently reached from the outer end of the carriage. By means of these rods and handles the supporting device may be pushed or pulled along the beams 4 into proper position beneath the portion of the car to be supported. It will now be apparent that by swinging the handles 24 in the proper direction the rods 23 may be rotated against the resistance of springs 23' so as to release the hooks 28 and permit the supporting device B to be lifted off from the carriage-beams. Normally the hooks will hold the two end portions of support B down on the respective beams 4 so as to prevent tipping in case the load is engaged by one of the platforms 12 before it is engaged by the other platform.

In Fig. 5 is illustrated a fragment of an automobile construction including a front axle 31 or its equivalent. While such an axle might be received directly on the beams 4 or on the platforms 12, there may be mechanism such as the portion of the steering device indicated at 32 positioned lower than the axle 31 which would be engaged by one or both of the platforms 12 or some other part of the carriage or supporting device before the axle 31 is engaged, and these auxiliary devices are not suitable for supporting the weight of the car. For this reason the chocks or supporting blocks 33 are provided, these blocks being interposed between the inner portions of the platform (preferably directly above the car in an elevated position, as shown in Fig. 5, thus preventing contact with and injury to the steering mechanism 32 or such other devices as may be positioned beneath the axle. Each of these blocks 32 may be conveniently shaped as shown in Fig. 6 with upwardly converging sides 33' and with a broad supporting base portion adapted to rest upon the inner end of platform 12 between the guide flanges 34. The base portion of block 33 is formed with a downwardly projecting tongue 35 having a transverse pin or outwardly projecting studs 36 which loosely engage in guideways 37 formed in casting 12. The outwardly projecting portion of platform or casting 12 is formed with a socket or housing 38 shaped to receive the block 33 so that one of its side faces 33' will rest within the housing and the other side face 33' will lie substantially flush with the upper surface of the platform and form a continuation thereof when the block is swung down to the inoperative position shown in Figs. 2 and 3 and in the left-hand portion of Fig. 4. The central bottom portion of housing 38 is cut away as indicated at 39 so that the block 33 may be pushed up out of the housing and then swung upwardly and inwardly to its upright position between the guide flanges 34, as shown in Fig. 5. The guideways 37 are so formed as to loosely receive the studs 36 and permit the block 33 to be moved from its operative to its inoperative position or vice versa without at any time permitting complete detachment of the block from the supporting platform. It will be apparent that these blocks may function as supports when in either their upright or their lowered positions. When lowered within the housing 38 the upwardly presented face of each block may serve as a portion of the supporting platform 12 or may directly engage a portion of the automobile in case this portion happens to be presented in vertical alignment with the block.

It will now be apparent that this device is of a universal character adapted to support many different types of automobile front-end assemblies. The automobile may be supported directly from the beams 4, from either the inner or outer portions of the platform 12, or from the blocks 33 in either their upright or lowered positions, according to which portion of the automobile structure is most accessible and best adapted to support the weight of the car. The supporting device B may be quickly moved longitudinally of the I-beams to a proper position beneath the load by means of handles 24, and if it is desired to remove the supporting assembly from the I-beams this may be quickly accomplished by simply swinging the handles 24 through a sufficient arc to release the hooks 28. If it is desired to use the blocks 33, these may be quickly pushed up into position, and when not in use these blocks form substantial portions of the supporting platforms.

I claim:

1. In an automobile hoist comprising a pair of spaced apart beams extending longitudinally beneath the automobile, a rigid member extending transversely of the beams and supported thereon so as to be movable lengthwise of the beams, said member having end portions extending laterally beyond the outer sides of the beams to engage and support portions of the automobile out of vertical alignment with the beams, means for removably holding said member on the beams to prevent tipping when a weight is supported by only one of the outwardly projecting ends and blocks attached to the end portions of the member and movable into and out of position to support a car axle above the member and out of direct engagement therewith.

2. In an automobile hoist comprising a pair of spaced apart beams extending longitudinally beneath the automobile, a member extending transversely of the beams and supported thereon so as to be movable lengthwise of the beams, said member having end portions extending laterally beyond the outer sides of the beams to engage and support portions of the automobile out of vertical alignment with the beams, each end portion being formed with a block-receiving socket, and blocks loosely attached to the end portions of the member and each movable from an upright position on the member in which position it supports a portion of the automobile on its upper end, to an inclined position in one of the sockets in which latter position one side face of the block is in substantially horizontal alignment with the upper face of the member and adapted to form a portion of the load-supporting surface of the member.

3. In an automobile hoist comprising a pair of spaced apart supporting beams extending longitudinally beneath the car, a means for supporting the front end portion of the automobile comprising a pair of similar platforms each slidably mounted on one of the beams and projecting laterally therefrom, a member extending transversely of the beams and tying the platforms rigidly together, a pull-rod pivotally mounted in each platform for shifting the platform longitudinally of the beam, a hook secured to the rod so as to engage beneath a portion of the beam and hold the platform thereto, and a spring positioned to swing the rod and hook into beam-engaging position.

4. In an automobile hoist comprising a pair of spaced apart supporting beams extending longitudinally beneath the car, a means for supporting the front end portion of the automobile comprising a pair of similar platforms each slidably mounted on one of the beams and projecting outwardly therefrom into position to support a portion of an automobile out of vertical alignment with the beam, a member extending transversely of the beams and tying the platforms rigidly together, and a block movably attached to each platform so as to be shiftable from an upright axle-supporting position on the platform to a lowered position so as to permit a portion of the automobile structure to rest directly on the platform.

5. In an automobile hoist comprising a pair of spaced apart supporting beams extending longitudinally beneath the car, a means for supporting the front end portion of the automobile comprising a pair of similar platforms each slidably mounted on one of the beams and projecting laterally therefrom, a member extending transversely of the beams and tying the platforms rigidly together, a pull-rod pivotally mounted in each platform for shifting the platform longitudinally of the beam, a hook secured to the rod so as to engage beneath a portion of the beam and hold the platform thereto, a spring positioned to swing the rod and hook into beam-engaging position and a block pivotally attached to each platform so as to be movable from an upright axle-supporting position on the platform to a lowered position so as to permit a portion of the automobile structure to rest directly on the platform.

6. In an automobile hoist comprising a pair of spaced apart supporting beams extending longitudinally beneath the car, a means for supporting the front end portion of the automobile comprising a pair of similar platforms each slidably mounted on one of the beams and projecting laterally therefrom, a member extending transversely of the beams and tying the platforms rigidly together, an axle-supporting block, a rest on the platform for holding the block in upright axle-supporting position, a socket in the platform for housing the block in lowered position, and connections between the block and platform permitting the block to be moved from one position to the other.

7. In an automobile hoist comprising a pair of spaced apart supporting beams extending longitudinally beneath the car, a means for supporting the front end portion of the automobile comprising a pair of similar platforms each slidably mounted on one of the beams and projecting laterally therefrom, a member extending transversely of the beams and tying the platforms rigidly together, a pull-rod pivotally mounted in each platform for shifting the platform longitudinally of the beam, a hook secured to the rod so as to engage beneath a portion of the beam and hold the platform thereto, a spring positioned to swing the rod and hook into beam-engaging position, an axle-supporting block, a rest on the platform for holding the block in upright axle-supporting position, a socket in the platform for housing the block in lowered position, and connections between the block and platform permitting the block to be moved from one position to the other.

8. In an automobile hoist comprising a pair of spaced apart beams extending longitudinally beneath the automobile, a means for supporting the front end portion of the automobile comprising a pair of similar platforms, each platform comprising a portion adapted to rest upon and be slidable longitudinally of a beam and an extension projecting laterally at the outer side of the beam in position to directly support portions of the automobile out of vertical alignment with the beam, and a member extending transversely between the beams and rigidly connecting the two platforms, and devices movable from operative to inoperative positions for removably holding each platform down on its respective beam to prevent tipping of the rigid means while permitting sliding movement lengthwise of the beams.

9. In an automobile hoist comprising a pair of spaced apart beams extending longitudinally beneath the automobile, a means for supporting the front end portion of the automobile comprising a pair of similar platforms, each platform comprising a portion adapted to rest upon and be slidable longitudinally of a beam and an extension projecting laterally at the outer side of the beam in position to directly support portions of the automobile out of vertical alignment with the beam, an axle-supporting block attached to the platform and movable from an inclined position at one side of the beam so that the automobile part may be supported directly upon the platform extension to an upright axle-supporting position upon the platform, and a member extending transversely between the beams and rigidly connecting the two platforms.

10. In an automobile hoist comprising a pair of spaced apart beams extending longitudinally beneath the automobile, a means for supporting the front end portion of the automobile comprising a pair of similar platforms, each platform comprising a portion adapted to rest upon and be slidable longitudinally of a beam and an extension projecting laterally at the outer side of the beam in position to directly support portions of the automobile out of vertical alignment with the beam, there being a socket formed in the extension, an axle-supporting block attached to the platform and movable from a position within the socket to an upright axle-supporting position upon the platform, and a member extending transversely between the beams and rigidly connecting the two platforms.

11. In an automobile hoist comprising a pair of spaced apart beams extending longitudinally beneath the automobile, a means for supporting the front end portion of the automobile comprising a pair of similar platforms, each platform comprising a portion adapted to rest upon and be slidable longitudinally of a beam and an extension projecting laterally at the outer side of the beam in position to directly support portions of the automobile out of vertical alignment with the beam, an axle-supporting block attached to the platform and movable from an inclined position at one side of the beam so that the automobile part may be supported directly upon the platform extension to an upright axle-supporting position upon the platform, a member extending transversely between the beams and rigidly connecting the two platforms, and devices movable from operative to inoperative positions for removably holding each platform down on its respective beam to prevent tipping of the rigid means while permitting movement lengthwise of the beam.

12. In an automobile hoist comprising a pair of spaced apart beams extending longitudinally beneath the automobile, a means for supporting the front end portion of the automobile comprising a pair of similar platforms, each platform comprising a portion adapted to rest upon and be slidable longitudinally of a beam and an extension projecting laterally at the outer side of the beam in position to directly support portions of the automobile out of vertical alignment with the beam, there being a socket formed in the extension, an axle-supporting block attached to the platform and movable from a position within the socket to an upright axle-supporting position upon the platform, a member extending transversely between the beams and rigidly connecting the two platforms, and devices movable from operative to inoperative positions for removably holding each platform down on the respective beam to prevent tipping of the rigid means while permitting movement lengthwise of the beam.

JOSEPH J. MIZER.